United States Patent [19]

Ryan

[11] 4,083,072
[45] Apr. 11, 1978

[54] CONNECTION SYSTEM FOR MARINE STRUCTURES

[76] Inventor: William J. Ryan, P.O. Box 367, Loreauville, La. 70552

[21] Appl. No.: 757,756

[22] Filed: Jan. 7, 1977

Related U.S. Application Data

[62] Division of Ser. No. 501,991, Aug. 30, 1974, Pat. No. 4,003,473.

[51] Int. Cl.² .............................................. E01D 1/00
[52] U.S. Cl. ......................................... 14/69.5; 61/48
[58] Field of Search .................... 14/71.1, 69.5; 61/48; 114/15 BD

[56] References Cited

U.S. PATENT DOCUMENTS

| | | | |
|---|---|---|---|
| 2,478,177 | 8/1949 | Beutel | 14/71.1 |
| 2,641,785 | 6/1953 | Pitts | 14/71.1 |
| 2,803,841 | 8/1957 | Wellens | 14/71.1 |
| 3,004,391 | 10/1961 | Miller | 14/71.1 X |
| 3,008,158 | 11/1961 | Stinson | 14/71.1 |
| 3,426,719 | 2/1969 | Mizell | 14/71.1 X |
| 3,808,625 | 5/1974 | Fowler | 14/71.1 |
| 3,875,603 | 4/1975 | Mampaey | 14/69.5 |
| 4,003,473 | 1/1977 | Ryan | 14/71.1 X |
| 4,011,615 | 3/1977 | Maxson | 14/71.1 |

*Primary Examiner*—Nile C. Byers
*Attorney, Agent, or Firm*—C. Emmett Pugh

[57] ABSTRACT

A method of and apparatus for connecting a material and personnel transfer ramp from an offshore oil structure, or the like, to a floating vessel which comprises a docking pedestal rigidly attached to the deck of a vessel, an attachment assembly which coverably and rotatably mounts onto the pedestal, the attachment assembly being provided with a swivel connection allowing attachment to a ramp mounted on an offshore structure, a line hanging down from the attachment assembly which is readily accessable from the boat, and a winch and associated line which guidably connects the attachment assembly on the ramp to the pedestal attached to the vessel. The limp hang line offers a great latitude of movements and ease of handling for connection in rough sea conditions. The correct method of attaching a free moving vessel to a stiff ramp structure is critical during the docking operation in order to prevent excessive shock loads.

11 Claims, 12 Drawing Figures

CONNECTION SYSTEM FOR MARINE STRUCTURES

REFERENCE TO RELATED APPLICATION

This application is a divisional of the prior copending application Ser. No. 501,991, filed Aug. 30, 1974, now Pat. No. 4,003,473, issued Jan. 18, 1977 and entitled "Combined Marine Ramp and Transfer System."

BACKGROUND OF THE INVENTION

1. Field of the Invention

The present invention relates to a connection system for connecting for example a marine vessel to a personnel ramp, thus allowing the transfer of personnel and/or material between the two. The present invention has been proven in the offshore marine industry in the transfer of personnel and/or material between a stationary object such as a platform and attached ramp and a moving object such as a boat, wherein the ramp-boat connection allows the boat to rotate, pivot and list in response to wave action.

2. Prior Art

One major problem facing the offshore industry today is the safe and efficient transfer of personnel and equipment between boats and fixed platforms. As industry goes farther offshore, wave heights in the neighborhood of 6 to 8 feet are relatively commonplace and can get to be much higher. The higher waves encountered frequently lead to delays, lost equipment dropped over the side and, in many instances, personal injury or loss of life. Additionally, high winds can become a negative factor. For example, out in the North Sea one can expect to be confronted with a wind blowing at 20 knots with 15 foot waves.

Several types of structures to permit transfers of personnel or cargo from two relatively moving objects, such as for example ships to other ships, or to stable objects such as for example platforms, have been known and used before in the prior art. Typical examples thereof in the moving boat to stable platform transfer art, which are actually and presently being used in the offshore marine industry, are a "monkey rope" system which is a rope hung from the stable platform wherein a man grabs the rope from the moving boat deck and swings to the platform; and a personnel basket system which is a rope-tied basket suspended from a cable and lowered by a service derrick located on the stable platform to transfer men and equipment from the platform to the deck of a moving boat or from the deck of a moving boat to the platform wherein the personnel hold on to the basket and are lifted to the structure by the crane; and finally a helicopter which permits the transfer through the airborne means between usually a land base to the stable platform. However, these actually used methods of the prior art either require considerable timing and dexterity on the part of the human operator to grasp for example the "monkey rope" when the boat deck is at the highest point of the swell and to be able to support his own weight and swing himself to the receiving deck and drop to safety there; or on the part of the crane operator in maneuvering the basket by his dexterity and ability, as well as an expensive crane structure and training that the crane operator must go through in order to safely transport people as well as the additional risk with human intervention of accidents occurring; or expensive equipment such as a helicopter which cannot operate during heavy weather; respectively.

Several types of direct attachment or ramp-type devices have also been known and used in the prior art to transfer cargo and personnel between ships or from ships to fixed platforms, and typical examples thereof in the marine transfer art are U.S. Pat. No. 3,064,829 issued Nov. 20, 1962 to Winfrey et al; U.S. Pat. No. 3,245,101 issued Apr. 12, 1966 to R. E. Wilson; U.S. Pat. No. 3,426,719 issued Feb. 11, 1969 to L. Mizell; U.S. Pat. No. 2,617,131 issued Nov. 11, 1952 to F. R. Harris; U.S. Pat. No. 3,228,051 issued Jan. 11, 1966 to Voase; U.S. Pat. No. 3,008,158 issued Nov. 14, 1961 to P. L. Stinson; U.S. Pat. No. 2,372,574 issued Mar. 27, 1945 to Haynes; U.S. Pat. No. 2,876,919 issued Mar. 10, 1959 to True, et al; U.S. Pat. No. 2,886,228 issued May 12, 1959 to Susikari; U.S. Pat. No. 3,095,848 issued July 2, 1963 to Dick; and U.S. Pat. No. 2,641,785 issued June 16, 1953 to Pitts, et al. Other patents of some interest to the general subjects of the present invention are the U.S. Pat. No. 3,067,716 issued Dec. 11, 1962 to Norlin, and U.S. Pat. No. 3,047,891 issued Aug. 7, 1962 to Golde, et al. However, none of these patents disclose a pivotal, rotational, yet solid connection between a ramp and a vessel.

It should be appreciated at the out-set that the present invention has solved a long standing problem and is satisfying a long felt need, whose solution and satisfaction has eluded the prior art workers lo these many years. Moreover, it should be further appreciated that the present invention is not based on a mere paper disclosure but rather is based on actual and successful use in the field.

3. Present Invention

In contrast to the prior art actually used in the offshore industry, which is incapable of safe, efficient, reliable, and inexpensive transfer of personnel and equipment from boats and platforms, the present invention in its most preferred embodiment utilizes a unique connection design which by means of its structure and attachment between the boat and the ramp or platform offers a more stable structural connection.

The invention provides a structural docking pedestal rigidly attached to a boat deck at preferably the center-line of the boat. An attachment assembly rotatably engages and latches to the docking pedestal. The attachment assembly is provided with a swivel connection on its upper surface for engaging the end portion of for example a boarding personnel ramp. The swivel connection allows both pivotal and rotational cooperation between the boat and the ramp.

Since the ramp attaching pedestal on the boat is preferably located on the center line of the boat, transverse activity is minimal at this point as compared to a point near the outboard side of the boat.

The activity of the ramp will never exceed the moving activity of the boat. Actually, when one steps on the ramp from the boat deck, the moving activity is identical, and will decrease proportionally as he walks toward the pivot deck. Attachment of the boat to the structure in the present invention is accomplished without outside assistance from anyone that is not on the boat. Because no one need be on the platform to assist with docking, this is especially important for unmanned or abandoned platforms.

Once moored to the platform by the unique attachment means of the present invention, the boat is significantly stabilized, thereby increasing the safety factor during the time it is necessary for men to walk on the boat's deck. It is noted that the most aggressive movements of a boat involves its transverse or rolling activity. The flexible ramp of the present invention is designed to conform to these transverse movements over its length in a directly proportional manner. No torsion exists in any of its members during the operation. The force necessary to reorient the ramp structure times the vertical distance from the metacenter of the boat offers a significant resistance moment.

Another method of additionally reducing the rolling activity of the boat allowed by the present invention is by engaging the boat engines and pulling against the ramp.

It is the combination of these resistances which are created or allowed by the present invention that renders significant stability to the rolling activity of the boat and an enhanced mooring capability. Although the most preferred embodiment of the present invention has a total mooring and stabilizing capability, additional mooring or stabilizing means or lines of course can be used as desired.

A quick release means is also provided in the present invention to permit the boat to immediately and completely disengage from the platform.

Docking is accomplished at considerable distance from the fixed structure due to the length of the ramp, thereby decreasing the damage potential to the boat or structure from collision of the two. Additionally, because the docking means is uniquely designed for ease of operation, the system is useful even in smooth waters. Reaction of the structure due to wave movements is less than if the boat were tied to the structure by a mooring line.

The present invention also allows considerable time saving because of its unique and easy means of attachment between the moving ship and the stationary platform in even very rough seas. Therefore, shut in wells can be reactivated as soon as the boat can get to the location; whereas, presently, boats frequently get out to the platform and then have to wait several hours before they can transfer crew and cargo because of wave heights. Under the present invention, as long as the boat can make the trip to the platform, the crew will be able to disembark.

Furthermore, the attachment means on the boat that engages the platform uses a very small deck area, thereby permitting better utilization of the boat deck area.

Moreover, a standard deck winch is used to pull the boat and the ramp together for attachment. This winch is equipped so that it will pay out under excessive loads and continue to pull in after the excessive load has passed. This will prevent undue shock to the entire system.

Also, this winch system allows the boat operator to continue applying the winch, even after the attachment is complete, without fear of breaking anything. It is this freedom from precise decision on the part of the boat operator that makes this system safe and usable for all boat "skippers".

Moreover, the boat activity is that of constantly pulling without slacking off, further simplifying the judgements needed by the boat operator.

It is noted that the ramp of the present invention can be used in all weather conditions and is only limited by the ability of the boat, to which the ramp is being connected, to operate. In order to not unnecessarily increase the costs of a particular installation, however, a ramp will usually be designed to handle a given size boat in conditions under which that boat can operate safely. However, a ramp and connection could be designed in accordance with the principles of the present invention to handle a battleship in a hurricane if cost factors were not a concern.

Thus, in summary, a basic, over-all object of the present invention is to provide a flexible yet structurally adequate connection system for connecting a boat to a ramp or platform.

Another object of the present invention is to provide a boat connection system which is safe, requiring a minimum of human involvement with the actual connection apparatus during the critical connection when high stresses cause injury.

A further object of the present invention is to provide a simple connection system between a vessel and for example a ramp which requires little operator skill to guide the connection parts together.

A final object of the present invention is to provide a boat/ramp connection system which is a paragon of simplicity, requiring only basic staple commodities for construction, thus providing an economical system.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENTS

Figure 1:
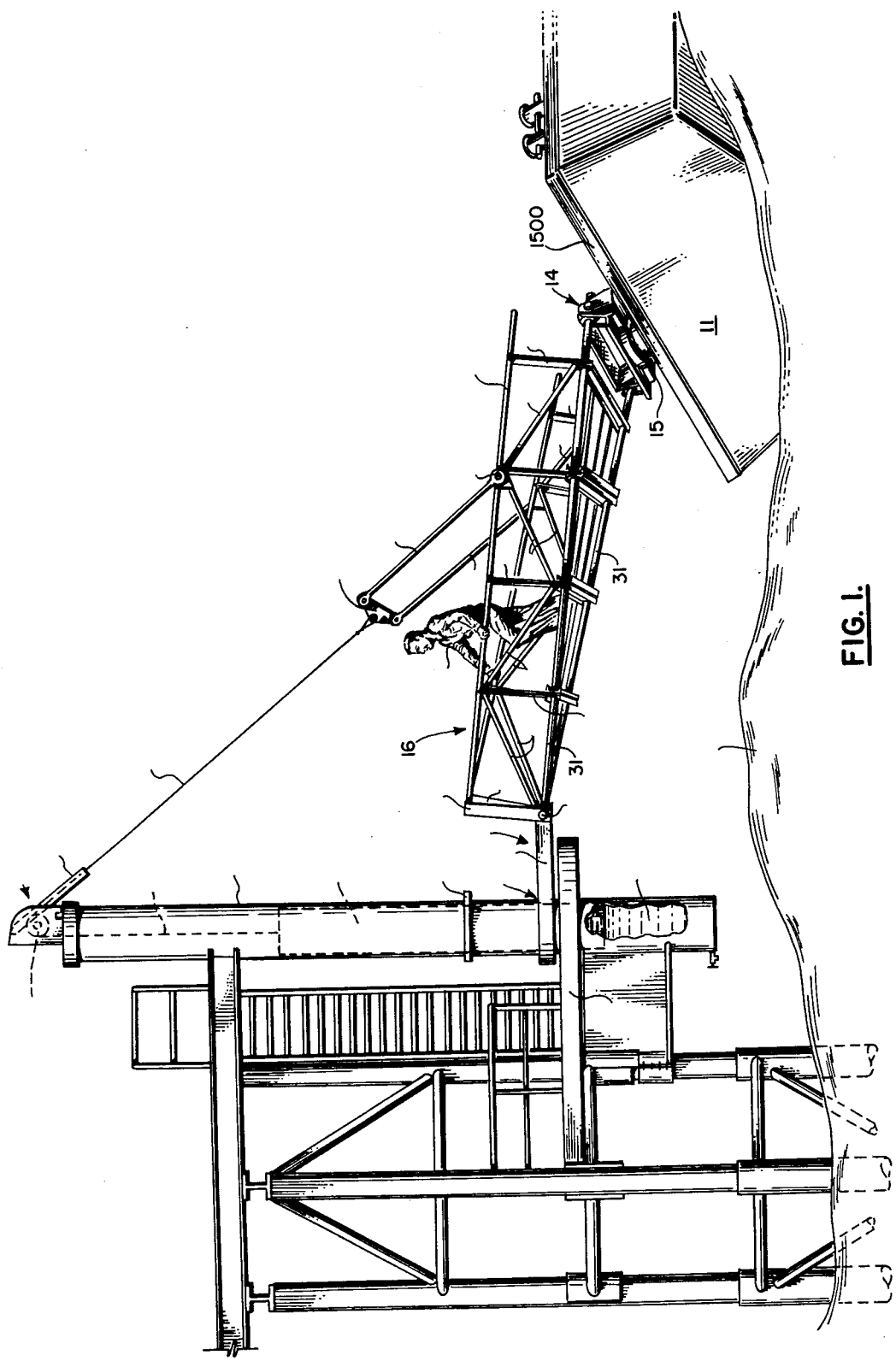
FIG. 1 is a generalized perspective view of the preferred embodiment of the apparatus of the present invention shown in use connecting an offshore platform ramp structure and the stern of a boat.

As can best be seen in FIG. 1, boat-ramp connector 14 is a device that attaches a flexible ramp 16 to docking pedestal 15, the latter of which is welded onto a boat deck 1500. The boat attacher 14 utilizes a large diameter cylindrical section 1401 which is pulled down to fit over and around the docking pedestal 15 (note FIG. 10) and is latched thereto by a spring loaded system (described more fully below), whereby the attacher deck 1400 is positioned over the top surface of the dock pedestal flange 1501 and the attacher cylindrical section 1401 rides against the vertical circumference of the flange 1501. This arrangement allows all the necessary lateral movement between the docking pedestal 15 and boat attacher 14.

The boat-ramp connector of the present invention thus utilizes a relatively large circumference of surface 1501 of the docking pedestal 15 to transmit the primary horizontal forces to ramp 16. Unit stress is greatly reduced by this large area. The secondary vertical forces are also distributed over a relatively large underside area of surface 1501.

Figure 3:
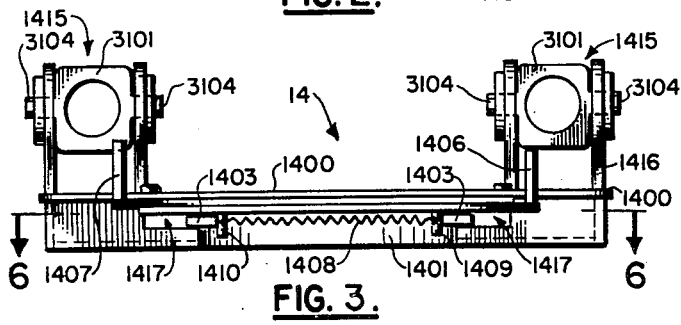
FIG. 3 is an end view of the preferred embodiment of the boat-ramp connection assembly of the present invention showing the boat connector assembly located on the outboard end of a flexible ramp.
Figure 4:
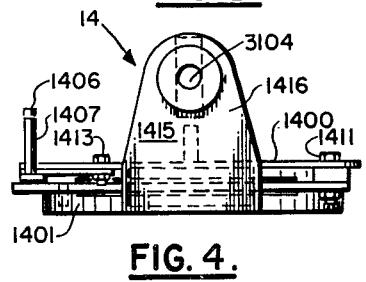
FIG. 4 is a side view of the preferred embodiment of the apparatus of the present invention.

The attacher assembly of boat attacher 14 thus uses a heavy wall, large diameter pipe 1401 (note FIG. 6) to accept the horizontal forces from the pedestal flange 1501 and then transmits these forces through a suitably stiffened deck 1400 and then to vertically mounted padeyes 1416. Although the padeyes 1416 create a moment, this arrangement was chosen to limit the height of the boat pedestal 15 but still allow adequate clearance when ramp 16 conforms to a downward position. The pins 3104 of the swivel connectors 3101 for stringers 31 are connected through the padeyes 1416 (note FIG. 3).

Figure 3A:
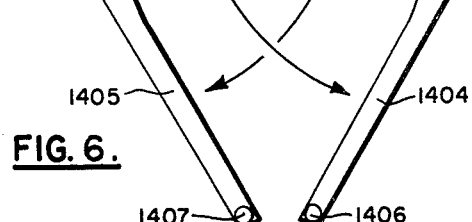
FIG. 3A is an exploded detail of the preferred embodiment of the apparatus of the present invention indicating the placement relationship of the outboard end of the stringer members of a ramp with respect to the welded rings and the swivel connectors fo the boat attacher.

As illustrated in FIG. 3A, each stringer 31 of ramp 16 is connected to and inserted within the swivel connector 3101 by means of a close fitting aperture therein, with the weld rings 3102 and 3103 preventing any relative movement in the longitudinal directions wherein each swivel connector 3101 is allowed to rotate about its respective stringer member 31 about the longitudinal axis of the stringer member 31. This rotatable but close fitting connection is very important as it makes any racking in the transverse members 27 relatively insignificant because the close tolerance fittings are not subject to significant eccentric loading.

The attacher assembly 14 allows movement in all directions. Vertical movement is permitted by the pins 3104 in the stringer swivel connectors 3101. Transverse movements are permitted by the ability of the swivel connectors 3101 to rotate about the stringers 31 with weld rings 3102 and 3103. Movement is permitted laterally by the ability of the attacher assembly 14 to rotate about the boat pedestal 15.

Figure 2:
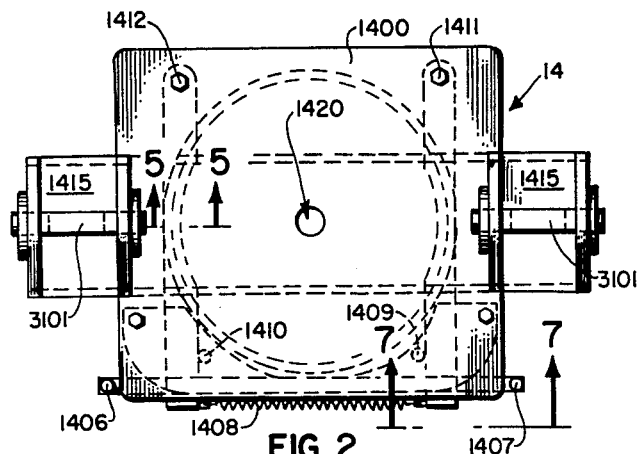
FIG. 2 is a plan view of the preferred embodiment of the boat-ramp connection assembly of the present invention.
Figure 5:
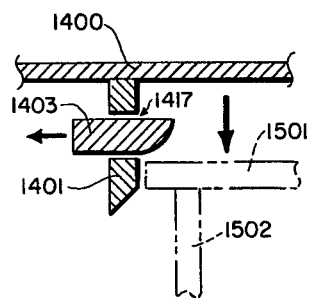
FIG. 5 is an end cross-sectional view of the preferred embodiment of the apparatus of the present invention taken along section lines 5—5 of FIG. 2 indicating the beveled bottom of the latching members as they penetrate the inside area of the boat pedestal flange housing.

The latching mechanism which keeps the boat attaching assembly 14 fastened to the boat docking pedestal 15 operates on the sliding wedge principle, as does a conventional door latch, using opposed wedge bars 1403 fitted within slots 1417 in the attacher pipe section 1401 as illustrated in FIG 5. The two flat bars 1403 are pinned by bolts 1411, 1412 on the inboard side (side closest to ramp 16) to the attacher deck 1400. They are fitted into the elongated slots 1417 (note FIGS. 3 and 5) located on both sides of the pipe section 1401 to bear toward the pedestal pipe section 1502. These latching members 1403 are shaped with a curved indentation (note FIGS. 2 and 6) so that they will engage the underside of the pedestal flange plate 1501 for a suitable distance. The bottom edges of latching members 1403 are beveled (note FIG. 5) so that when they contact the pedestal flange top 1501, the latching bars 1403 are forced outboard, pivoting on bolts 1411, 1412, allowing the boat attacher assembly 14 to continue through until its deck surface 1400 contacts the deck of the flange member 1501 of the docking pedestal 15. The spring 1408 located on the outboard end of the latching bars 1403 will return the latching bars 1403 under the pedestal flange top 1501 of the docking pedestal 15 for a completed latch up.

Figure 6:
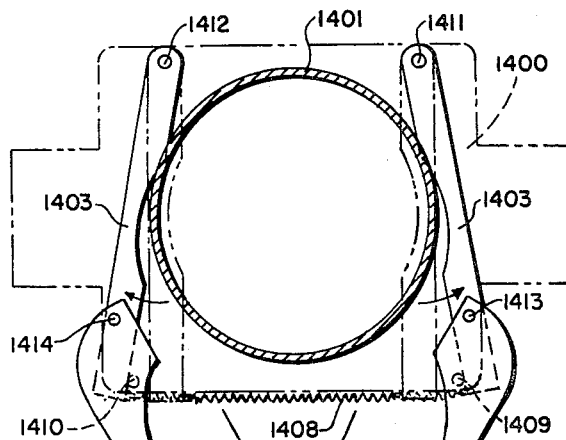
FIG. 6 is a top, partial, cross-sectional view taken along section line 6—6 of FIG. 3 of the preferred embodiment of the apparatus of the present invention showing the operation of latching members of the connection assembly.
Figure 7:
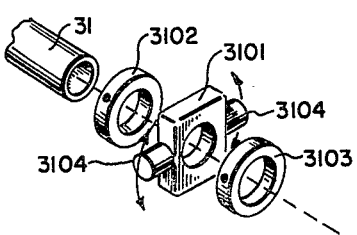
FIG. 7 is a partial elevated view of the preferred embodiment of the apparatus of the present invention taken along section line 7—7 of FIG. 2 showing the vertical arrangement of the releasing levers.

For disengaging the boat 11 from the boat attacher 14, releasing levers 1404 and 1405 are provided to push the latching bars 1403 apart by lugs 1409 and 1410, as shown in FIG. 6, thereby extending the locking bars 1403 beyond the distance of pedestal flange top 1501. As indicated by the arrows in FIG. 15, the releasing levers 1404 and 1405 are rotated about the pivot bolts 1413 and 1414, respectively, by means of a workman pulling on vertical handles 1406 and 1407, respectively. This allows the ramp 16 to be removed from boat docking pedestal 15, and the boat 11 is disengaged from the ramp structure. After the boat attacher 14 is disconnected from the docking pedestal 15, the spring 1408 will pull the releasing levers and locking bars back into their biased position (illustrated in FIG. 2) until the attacher is used again.

It is noted that one end of each releasing lever 1404 and 1405 is pinned by bolts 1413 and 1414, respectively, to attacher deck 1400 which allows pulling of the free end by the handle 1406 and 1407, respectively, in a radial motion. Because there is considerable mechanical advantage involved in the lever action, only a small amount of force is required to operate them. A line (not illustrated) attached to handles 1406 and 1407 would allow quick disconnect from any place on the boat deck 1500.

Figure 8:
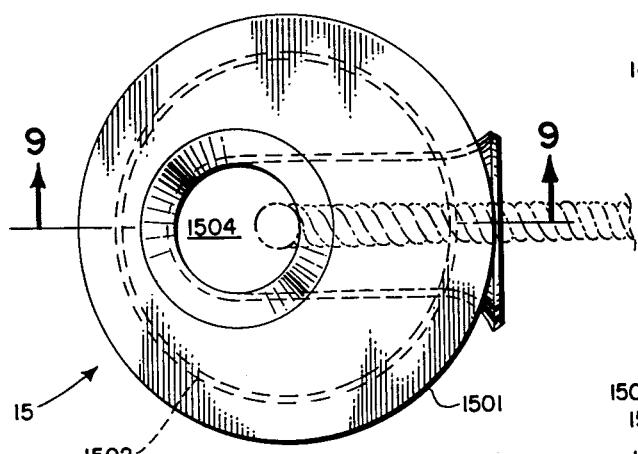
FIG. 8 is a plan view of the preferred embodiment of the present invention showing the boat docking pedestal which is the fitting which is attached to the boat and allows attachment between the boat and a ramp.
Figure 9:
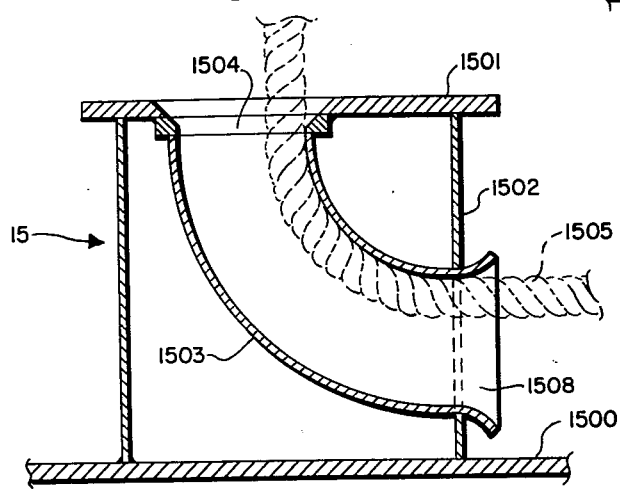
FIG. 9 is a side cross-sectional view of the preferred embodiment of the apparatus of the present invention taken along section line 9—9 of FIG. 8 showing the attaching line connection.
Figure 11:
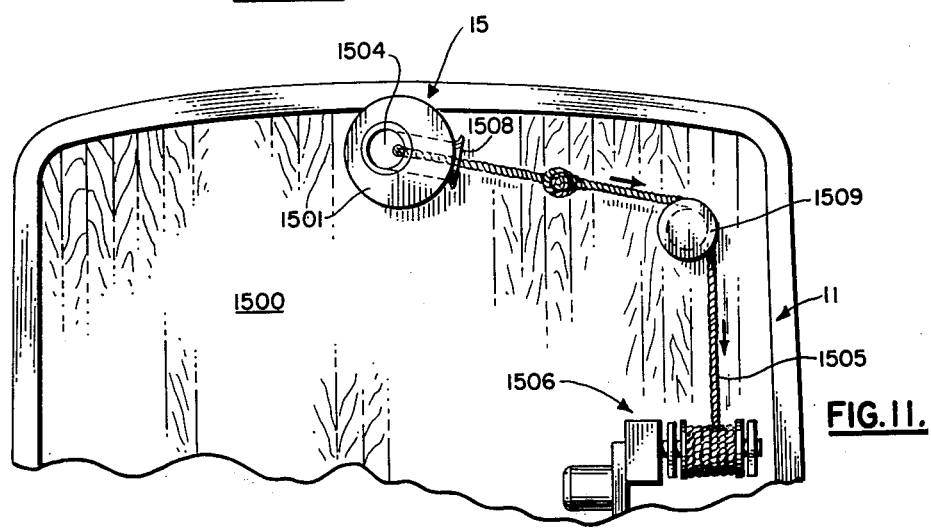
FIG. 11 is a partial, plan view of the preferred embodiment of the apparatus of the present invention showing the stern of the boat and the arrangement of the boat docking pedestal, deck button and mooring winch.

As illustrated in FIGS. 8 and 9, the boat pedestal 15 includes a round flange plate 1501 welded to the top of a pipe section 1502. The flange plate 1501 extends beyond the outside diameter of the pipe 1502 in order that the latching bars 1403 of the boat attaching assembly 14 can engage under the flange 1501. Another element of the boat docking pedestal 15 involves a long radius weld ell 1503 which is welded to the underside of the flange plate 1501, with a suitable hole 1504 cut in the flange plate 1501 of the same diameter as the inside diameter of the ell 1503. This hole is positioned eccentrically with respect to the center of the flange plate 1501. The exact position of the ell is a function of the diameter of the hang line and the inside radius of the weld ell 1503. The inside minimal radius of the ell 1503 is positioned a distance equal to one-half the diameter of the hang line 1418 (note FIG. 10) from the center of the flange plate 1501. This will allow the center of the hang line 1418 to coincide with the center of the flange plate 1501 when the winch 1506 is pulling on the hang line 1418 by means of pull line 1505.

As noted above, the size of the weld ell 1503 is determined by the size of the hang line 1418. The inside diameter of the ell 1503 is large enough to accomodate the free movement of the hang line knot 1419 while it is attached to the eye or loop 1507 on the end of the winch line 1505.

The bottom or end 1508 of the weld ell 1503 extends beyond the outside diameter of the pipe pedestal section 1502. The end 1508 of the ell fabrication is belled to prevent chafing of the winch line 1505 or hang line 1418. The flange plate and weld ell opening 1504 are also beveled to decrease hang line and pull line chafing.

The docking pedestal 15 is positioned on the boat deck 1500 so that the bottom 1508 of the ell 1503 will accept the winch line 1505 directly in line as it comes from the winch 1506. In most instances, it is usually desirable for the pedestal 15 to be positioned so that the bottom 1508 of the ell 1503 will accept the winch line 1505 after it has been diverted around a line guide 1509. This usually lends to better utilization of the boat deck area.

Although the boat attacher 14 and pedestal 15 have been found to be most satisfactory in use, many other connection means in general or other forms of latches are possible.

It is noted that, in practically all circumstances, it is desirable to reinforce the boat structure in order to accomodate the forces which are placed on the docking pedestal 15 when connected to the ramp 16.

Method of Boat/Ramp Attachment

The deck winch 1506 is provided to pull the boat 11 and the ramp 16 together for attachment. The winch 1506 is equipped so that it will pay out under excessive loads and continue to pull in after the excessive load has passed. This will prevent undue shock to the entire system. Another advantage of this type of winch arrangement is that it allows the boat operator to continue applying the winch, even after attachment is complete, without fear of breaking anything.

Figure 10:
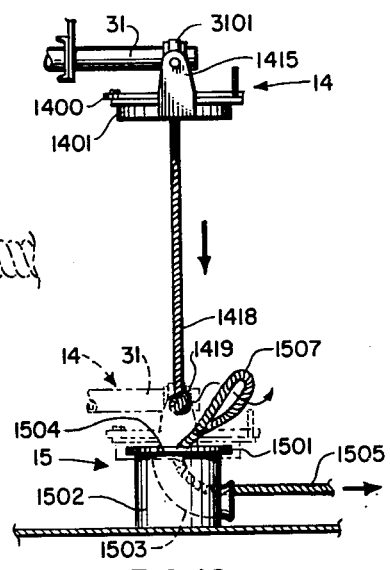
FIG. 10 is a side elevation view of the preferred embodiment of the apparatus of the present invention which shows the outboard end of a flexible ramp with the hang line and its association with the boat docking pedestal including one method of attaching the hang line to the winch line.

As illustrated in FIG. 10, a hang line 1418 is attached in the center of the boat attacher assembly 14 located on the outboard end of the flexible ramp 16. A short section of chain (not illustrated) may be used at the point where the hang line 1418 is fastened to the boat attacher assembly 14 to prevent excessive shear and chafing of the hang line. The hang line extends down approximately to water level (with the ramp in the up position). There is a knot 1419 on the bottom end of the hang line 1418, and this simple knot is the main initial element for attaching the hang line 1418 to the winch line 1506.

Attachment of the hang line 1418 to the winch line 1505 is accomplished by a deck hand passing the knot 1419 on the end of the hang line 1418 through an eye or loop 1507 spliced on the end of the winch line 1505 (note FIG. 10). Because the line 1505 is preferrably of nylon so as to be extremely pliable, it will tend to squeeze the hang line 1418 by the force caused by its own weight. The boat 11 is propelled forward, pulling the two lines taut, greatly increasing the squeezing activity, while the knot 1419 on the hang line 1418 prevents the eye 1507 from slipping off.

With the boat still pulling slightly, the winch 1506 is engaged to pull the ramp attacher 14 and the docking pedestal 15 together for a soft landing.

After the winch 1506 has pulled the attacher assembly 14 unto the docking pedestal 15 to automatically latch them together by means of the locking assembly described above, the hang line 1418 is released from the winch line 1505. This is done by merely taking the knot 1419 out of the eye 1507 because the lines are slack as a result of letting off on the winch 1506, after connecting the attacher assembly 14 to the boat pedestal 15.

Thus, in step-by-step format and in further detail, the method of attaching the ramp 16 to the boat 11 in the present invention, with particular reference to FIG. 10, is as follows:

1. The eye 1507 spliced in the end of the winch line 1505 is passed through the bottom opening of the ell 1503, which is welded into the boat docking pedestal, and is pulled out of the top aperture 1504 of the assembly for a reasonable length.

2. The boat is maneuvered so that the deck hand may get the hang line 1418 that extends down from the outboart end of the ramp 16.

3. The deck hand passes the knot 1419 on the hang line 1418 through the eye 1507 spliced in the end of the winch line (note curved arrow in FIG. 10), and then he squeezes the eye around the hang line and releases all lines.

4. The boat engines are engaged so that the hang line 1418 and the attached winch line 1505 become taut. This condition of line tautness is maintained by minimal thrust from the boat engines during the entire attaching procedure.

5. When the winch 1506 is engaged, it overcomes the thrust of the boat engines, the forces of the wind and sea, and the force of the counterweight 192 which serves to lift and counterbalance the ramp 16. The boat 11 and ramp 16 are brought together by the winch 1506, and attachment is automatic through the latching system described above.

6. The deck hand checks to see if the attachment is correct, then releases the hang line 1418 from the winch line 1506.

This application is a divisional of the prior copending application Ser. No. 501,991 filed Aug. 30, 1974 now Pat. No. 4,003,473, issued Jan. 18, 1977 and entitled "Combined Marine Ramp and Transfer System". The specification of that parent application is hereby included totally and made a part of the present application for the purpose of disclosure and forms a part of the present disclosure hereof.

Although a particular, detailed embodiment of the boatramp connection apparatus has been described and illustrated, it should be understood that the invention is not restricted to the details of the preferred embodiment, and many changes in application design, configuration and dimensions are possible without departing from the scope of the invention.

What is claimed as invention is:

1. A system for connecting for example a personnel ramp on one marine structure to a second marine structure, at least one of said structures being a floating vessel, which system comprises:
   a. a structural docking pedestal affixed to the second marine structure;
   b. connection means on said ramp for docking one end portion of said ramp with said pedestal;

c. a frame connected to the docking end of said pedestal and rotatably mounted on said pedestal;

d. swivel means associated with said frame for swiveling engaging said ramp;

e. locking means associated with said frame for securing said frame on said pedestal;

f. elongated flexible means associated with said connection means for bringing said connection means into the proximity of said pedestal; and g. power means associated with said elongated flexible means for perfecting a connection between said docking pedestal and said connection means;

said locking means being opened when said frame is pulled onto said pedestal by said power means, and said locking means being closed, securing said frame on said pedestal when said power means completely pulls said frame onto said pedestal.

2. An apparatus for connection an extended member on one marine structure to a second marine structure, which apparatus comprises:

a. A docking pedestal attached to the second marine structure, said pedestal provided with a flanged shoulder portion; and b. Attachment means for connecting the extended member to said pedestal, comprising:

(i) a lower body section rotatably fittable over said pedestal;

(ii) a deck portion rigidly coverably connected to the upper portion of said body section;

(iii) latching means on said attachment means for engaging and securing the flanged portion of said pedestal when said attachment means is pulled in to rotatble cooperation with said pedestal;

(iv) swivel means on said deck portion of said attachment means for rotatably and pivotally connecting to the end porion of the extended member.

3. The apparatus of claim 2 wherein there is further included leverage means on said attachment means from said docking pedestal.

4. The apparatus as described in claim 3 wherein said latching means is a plurality of levers pivotally mounted to the underside portion of said attachment means, said levers having one end thereof pivotally connected to said attachment means and the other end provided with an urging means for urging the inner edges of said levers toward the central portion of said attachment means.

5. The apparatus as described in claim 4 wherein said levers have an inward bevel on their inner surface which slidably contacts the flanged shoulder portion of said pedestal thereby urging said levers outwardly with respect to said pedestal when said attachment means is pulled over said pedestal.

6. The apparatus as described in claim 2 wherein said swivel means includes a plurality of padeyes provided with a corresponding plurality of swivels pivotally mounted therein, said swivels provided with apertures therein capable of receiving the end portion of the extented member.

7. The apparatus as described in claim 2, wherein there is further provided a docking pull line suspendedly attached at one end portion to said attachment means, and said pedestal is provided with a central L-shaped hawse pipe, capable of threadably receiving said pull line, and pulling means for engaging and pulling said pull line after it is threaded through said hawse pipe of said pedestal.

8. The apparatus as described in claim 2, wherein there is further provided:

a. a hang line which is suspendedly attached at one end portion to said attachment means;

b. a winch line capable of being attached at one end portion to the end portion of said hang line;

c. a hawse pipe centrally mounted in said pedestal, such that said hang line of said attachment means can be threadably secured through said hawse pipe of said pedestal; and d. winch means for frictionally engaging said winch line and said attached pull line, thereby guiding said attachment means onto said pedestal.

9. The apparatus of claim 8, wherein said hawse pipe is an L-shaped pipe having one opening in the top portion of said pedestal and the other opening in the side portion of said pedestal.

10. A method for connecting an extended member on one marine structure to a second marine structure, at least one of said structures being a floating vessel, for example, for connecting a personnel ramp to a floating vessel, comprising the steps of:

a. providing a docking pedestal on the deck portion of the second marine structure, said docking pedestal provided with guide means for guidably receiving an elongated flexible member therethrough;

b. providing an attachment means and locking means on said extended member for connecting and securing said member to said docking pedestal on said second marine structure, said attachment means provided with an elongated flexible member attached to the underside portion of said attachment means;

c. threading said elongated flexible member through said guide means on said docking pedestal; and d. applying tensile force to the end portions of said elongated flexible member until said attachment means connects with locks to said docking pedestal.

11. A method for connecting, for example, a personnel ramp to a floating vessel comprising the steps of:

a. providing a docking pedestal on the deck portion of the vessel, said docking pedestal provided with a flanged shoulder portion and with guide means for threadably receiving a rope therethrough;

b. providing an attachment means on said personnel ramp for connecting said ramp to said docking pedestal on said vessel, said attachment means comprising:

(i) a lower body section rotatably fittable over said pedestal;

(ii) a deck portion rigidly, coverably connected to said upper portion of said body section;

(iii) latching means on said attachment means for engaging and securing the flanged portion of said pedestal when said attachment means is pulled into rotatable cooperation with said pedestal;

(iv) swivel means on said deck portion of said attachment means for rotatably and pivotally connecting to the end portion of the boarding ramp; and (v) rope means attached to the underside portion of said body section of said attachment means, said rope means being rovided with a loop at its end portion opposite its point of attachment to said body section of said attachment means;

c. threading said rope through said docking pedestal; and d. applying tensile force to said end portion of said rope until said attachment means connects with said docking pedestal.

* * * * *